(12) United States Patent
Sue et al.

(10) Patent No.: US 7,518,812 B2
(45) Date of Patent: Apr. 14, 2009

(54) LENS DRIVE DEVICE

(75) Inventors: Takeshi Sue, Nagano (JP); Yukio Furuya, Nagano (JP); Jaegyeong Suh, Kyungnam (KR)

(73) Assignees: Nidec Sankyo Corporation (JP); Samsung Techwin Co., Ltd. (KR)

( * ) Notice: Subject to any disclaimer, the term of this patent is extended or adjusted under 35 U.S.C. 154(b) by 0 days.

(21) Appl. No.: 12/025,930

(22) Filed: Feb. 5, 2008

(65) Prior Publication Data

US 2008/0192368 A1    Aug. 14, 2008

(30) Foreign Application Priority Data

Feb. 5, 2007    (JP)    ............... 2007-25767
Dec. 17, 2007    (JP)    ............... 2007-324158

(51) Int. Cl.
G02B 7/02    (2006.01)
G02B 15/14    (2006.01)

(52) U.S. Cl. .................. 359/824; 359/694; 359/814; 359/822

(58) Field of Classification Search ......... 359/694–698, 359/813, 814, 822–824
See application file for complete search history.

(56) References Cited

U.S. PATENT DOCUMENTS 6,856,469 B2 * 2/2005 Yoneyama et al. .......... 359/696
7,298,562 B2 * 11/2007 Sue et al. .................... 359/819

FOREIGN PATENT DOCUMENTS

JP    2005-128392 A    5/2005

* cited by examiner

*Primary Examiner*—Mohammed Hasan
(74) *Attorney, Agent, or Firm*—Cantor Colburn LLP

(57) ABSTRACT

A lens drive device includes a lens movable body provided with a lens and a drive mechanism for moving the lens movable body from a home position in an optical axis direction of the lens. The drive mechanism includes a magnet and a plurality of coils which is disposed so that the magnet is interposed in the optical axis direction of the lens. An electric current is supplied to the plurality of coils in a reverse direction to a direction of an electric current, which is supplied to the plurality of coils for moving the lens movable body, for restricting movement from the home position of the lens movable body. Therefore, swinging and rattling are hard to occur in the lens movable body and thus its impact resistance can be enhanced.

13 Claims, 5 Drawing Sheets

When vibrated, ... → Sleeve 15 is Restricted to the Home Position with Reverse Current.

LENS DRIVE DEVICE

The present invention claims priority under 35 U.S.C. §119 to Japanese Application No. 2007-25767 filed Feb. 5, 2007 and Japanese Application No. 2007-324158 filed Dec. 17, 2007, both of which are incorporated herein by reference.

FIELD OF THE INVENTION

The present invention relates to a lens drive device in which a lens is movably driven in an optical axis direction to form an image of an object.

BACKGROUND OF THE INVENTION

In recent years, as cell phones with camera on which a camera is mounted have been widely spread, opportunities in which various objects are photographed by the cell phone have been increasing. For example, there may be a case that an object such as a friend or landscape, which is far from a lens of the camera to some extent, is photographed (normal photographing), or there may be a case that an object such as a timetable for a bus or petals of a flower which is near the lens of the camera is photographed (close-up photographing).

In a case of a close-up photographing (macro-photographing), the lens of the camera is required to locate at a position nearer to the object than a position at the time of a normal photographing. Therefore, this type of a photographing lens system is provided with a drive mechanism for driving a lens to move in an optical axis direction. The drive mechanism is driven with a switch to move the lens in the optical axis direction (see, for example, Japanese Patent Laid-Open No. 2005-128392, paragraph [0014]).

In the lens drive device which is disclosed in the above-mentioned Patent Reference, a lens support body is moved in the optical axis direction of the lens by an electro-magnetic force which is generated through energization of a coil. Under a state that the coil is not energized, the lens support body is urged to a main base by two springs. In this manner, since a home position of the lens is fixed when the camera is not used, swinging and rattling are hard to occur in the lens support body and, as a result, its impact resistance can be improved.

However, in order to further surely prevent the swinging and rattling of the lens support body, strengths of two pieces of the springs are required to increase but, in this case, an electric current for starting to move the lens support body (starting current) becomes large. In other words, in the lens drive device disclosed in the above-mentioned Patent Reference, fixing the lens support body to a prescribed home position and reducing the starting current are in an exclusive relation to each other and it is difficult to attain both functions.

SUMMARY OF THE INVENTION

In view of the problems described above, an object of the present invention is directed to providing a lens drive device which is capable of reducing a starting current while improving its impact resistance.

Thus, according to an embodiment of the present invention, there may be provided a lens drive device as described in the following examples.

FIRST EXAMPLE

A lens drive device comprising:

a lens movable body which is provided with a lens;

a drive mechanism for moving the lens movable body from a home position in an optical axis direction of the lens; and a fixed body which movably supports the lens movable body in the optical axis direction of the lens;

wherein the drive mechanism includes a magnet and a plurality of coils which is disposed so that the magnet is interposed in the optical axis direction of the lens; and wherein one of the magnet and the plurality of coils is provided in the lens movable body and the other of the magnet and the plurality of coils is provided in the fixed body; and wherein an electric current is supplied to the plurality of the coils in a reverse direction to a direction of an electric current, which is supplied to the plurality of the coils to move the lens movable body, to restrict movement from the home position of the lens movable body.

According to the first example, the lens drive device is provided with the drive mechanism for moving the lens movable body in the optical axis direction and the fixed body which movably supports the lens movable body in the optical axis direction, and the drive mechanism includes the magnet and the plurality of the coils. In addition, movement of the lens movable body from the home position is restricted by means of that an electric current is supplied to the plurality of the coils in the reverse direction to the direction of the electric current which is supplied to move the lens movable body. Therefore, when the electric current is supplied in the reverse direction, the lens movable body is restricted at the prescribed home position. As a result, swinging and rattling are hard to occur in the lens movable body and thus its impact resistance can be enhanced. Further, when swinging and rattling are hard to occur, silentness can be enhanced.

In addition, according to the first example, movement of the lens movable body from the home position is restricted by means of that an electric current is supplied to the plurality of the coils in the reverse direction to the direction of the electric current which is supplied to move the lens movable body. Therefore, an electric current which is required to start moving the lens movable body (starting current) can be reduced. Specifically, in order to enhance impact resistance in the conventional lens drive device disclosed in the above-mentioned Patent Reference, strengths of the two springs are required to increase and, as a result, the lens support body is hard to be moved and thus its starting current becomes large. However, according to the first example, as described above, movement of the lens movable body is restricted by supplying an electric current in the reverse direction. Therefore, for example, even when two springs are used, impact resistance can be enhanced while their strengths are reduced and thus the starting current can be reduced. In this first example, structural members such as the spring may not be provided and, in this case, manufacturing cost can be reduced.

In this first example, the "prescribed home position" means a position of the lens movable body in a state that the plurality of the coils is not energized. The "prescribed home position" may be one position or a plurality of positions which are previously determined. Further, the "home position" may be set at any position within the lens drive device. For example, a position apart farthest from an object to be photographed in a moving range of the lens movable body may be set as the home position, a position closest to the object may be set as the home position, or an intermediate position (position in a state where the lens movable body is floated) may be set as the home position.

Further, the phrase of "movement from the home position is restricted" means that the lens movable body is maintained so as to stay at the home position. As described below, the movement may be restricted by being pressed against an abutting part, the movement may be restricted by a force of action/counteraction acting between an urging member and the lens movable body, or another appropriate means may be used.

In addition, a time period (energization period) and a timing (energization timing) of "an electric current is supplied to the plurality of the coils in the reverse direction to the direction of the electric current which is supplied for moving the lens movable body" may be utilized in any appropriate manner. For example, in a case that a sensor for detecting an external force is provided in the lens drive device, the electric current may be supplied when the external force is detected with the sensor. Alternatively, the electric current may be supplied during a constant time period (for example, until the detection of the external force with the sensor stops), the electric current may be supplied at a constant interval (interval energization), or the electric current may be supplied continuously (continuous energization).

In the first example, the magnet and the plurality of the coils which structure the "drive mechanism" may be provided in either of the lens movable body and the fixed body. For example, when the magnet is provided in the lens movable body, the plurality of the coils is provided in the fixed body and, alternatively, when the plurality of the coils is provided in the lens movable body, the magnet is provided in the fixed body.

SECOND EXAMPLE

In the lens drive device according to the above-mentioned first example, an abutting part is provided for restricting the movement of the lens movable body and, when the electric current is supplied to the plurality of the coils in the reverse direction to the direction of the electric current which is supplied to the plurality of the coils for moving the lens movable body, the lens movable body is pressed against the abutting part.

According to the second example, the above-mentioned lens drive device is provided with the abutting part for restricting the movement of the lens movable body and, when the electric current is supplied to the plurality of the coils in the reverse direction to the direction of the electric current which is supplied to the plurality of the coils for moving the lens movable body, the lens movable body is pressed against the abutting part. Therefore, the impact resistance can be further securely enhanced. In other words, in a case that the movement is restricted by means of that the lens movable body is pressed against the abutting part, even when an external force is applied, swinging and rattling are made less likely to occur in the lens movable body and thus impact resistance can be enhanced. The "abutting part" may be formed at any position and may be formed in any size and in any shape. For example, it may be structured that a part of the fixed body is formed so as to function as the abutting part.

THIRD EXAMPLE

In the lens drive device according to the above-mentioned first or second example, the drive mechanism includes an urging member which urges the lens movable body to the home position.

According to the third example, the drive mechanism includes an urging member which urges the lens movable body to the home position. Therefore, impact resistance is secured at the time of normal photographing and, at the time of macro-photographing, the lens movable body can be held at a desired position with a low starting current. In other words, the lens movable body can be held at the desired position by adjusting the position where an electromagnetic force generated through supplying an electric current to the plurality of the coils and an urging force of the urging member are balanced with each other.

FOURTH EXAMPLE

In the lens drive device according to one of the above-mentioned first through third examples, the drive mechanism includes a magnetic member which is magnetically attracted to the magnet.

According to the fourth example, since the drive mechanism includes a magnetic member which is magnetically attracted to the magnet, a magnetic attractive force acts between the magnetic member and the magnet. Therefore, at the time of normal photographing (alternatively, when the camera is not used), impact resistance is enhanced by the magnetic attractive force. The "magnetic member" in the fourth example can enhance impact resistance even when the electric current is not supplied to the plurality of the coils in the reverse direction to the direction of the electric current which is supplied to the plurality of the coils for moving the lens movable body. The "magnetic member" may be formed in a spherical shape or a ring (circular) shape and, in other words, the "magnetic member" may be formed at any shape, any size and any material.

FIFTH EXAMPLE

In the lens drive device according to the above-mentioned fourth example, the magnetic member is formed in a spherical shape.

According to the fifth example, since the magnetic member is formed in a spherical shape, a magnetic attractive force is easily adjusted, for example, by changing the number of the magnetic members. As a result, a satisfactory impact resistance can be realized in combination with the effect of "the electric current supplied in the reverse direction to the direction of the electric current which is supplied to the plurality of the coils for moving the lens movable body". In the fifth example, the spherical "magnetic member" can be simply and easily manufactured at a low cost and can be easily assembled into the lens drive device.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

An embodiment of the present invention will be described below with reference to the accompanying drawings.

Figure 1:
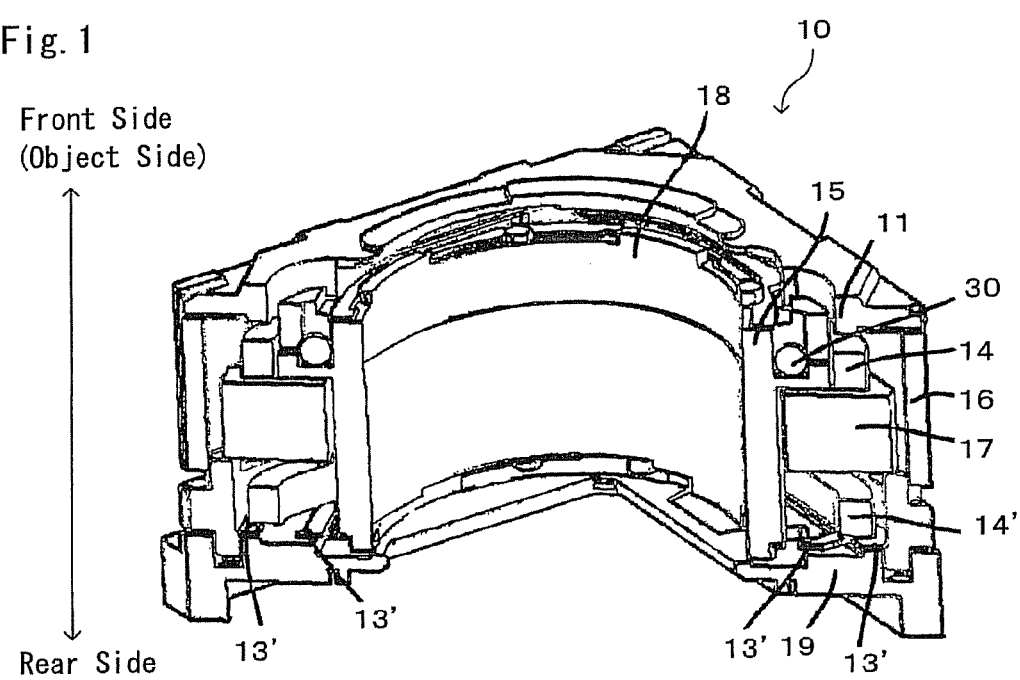
FIG. 1 is a perspective cross sectional view showing a mechanical structure of a lens drive device in accordance with an embodiment of the present invention.
Figure 2:
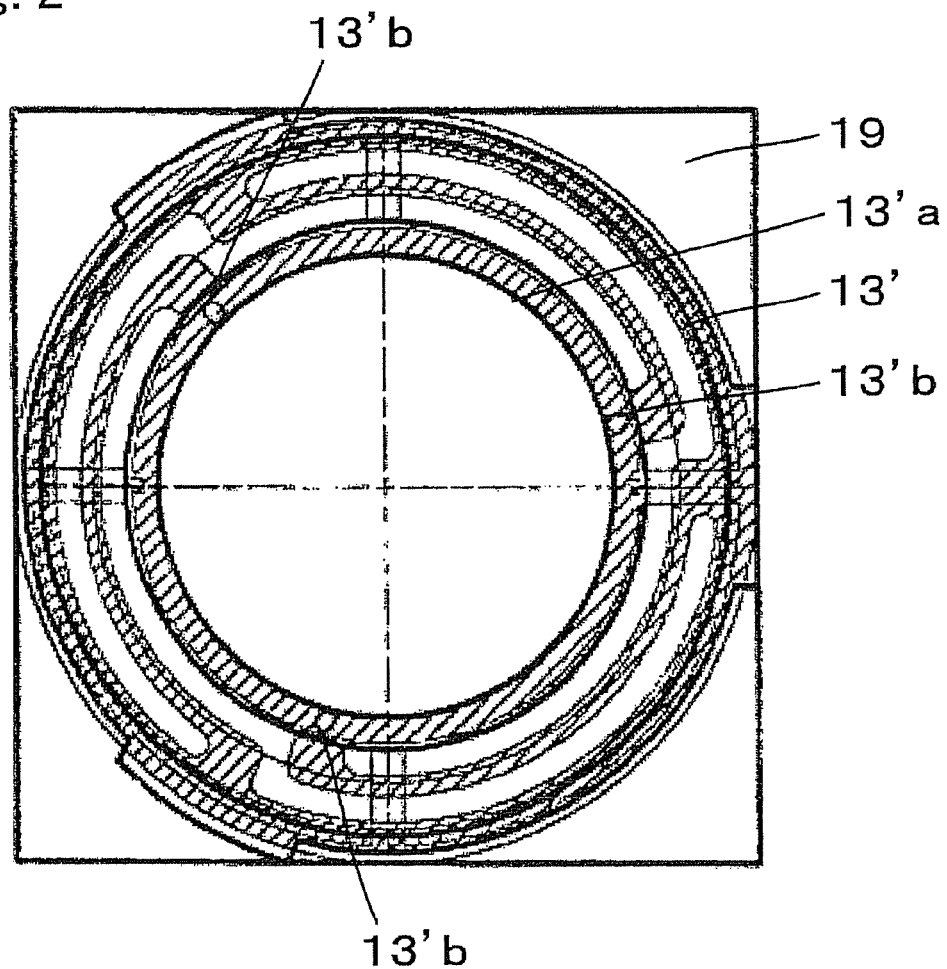
FIG. 2 is a plan view showing a structure of a plate spring in the lens drive device shown in FIG. 1.
Figure 3:
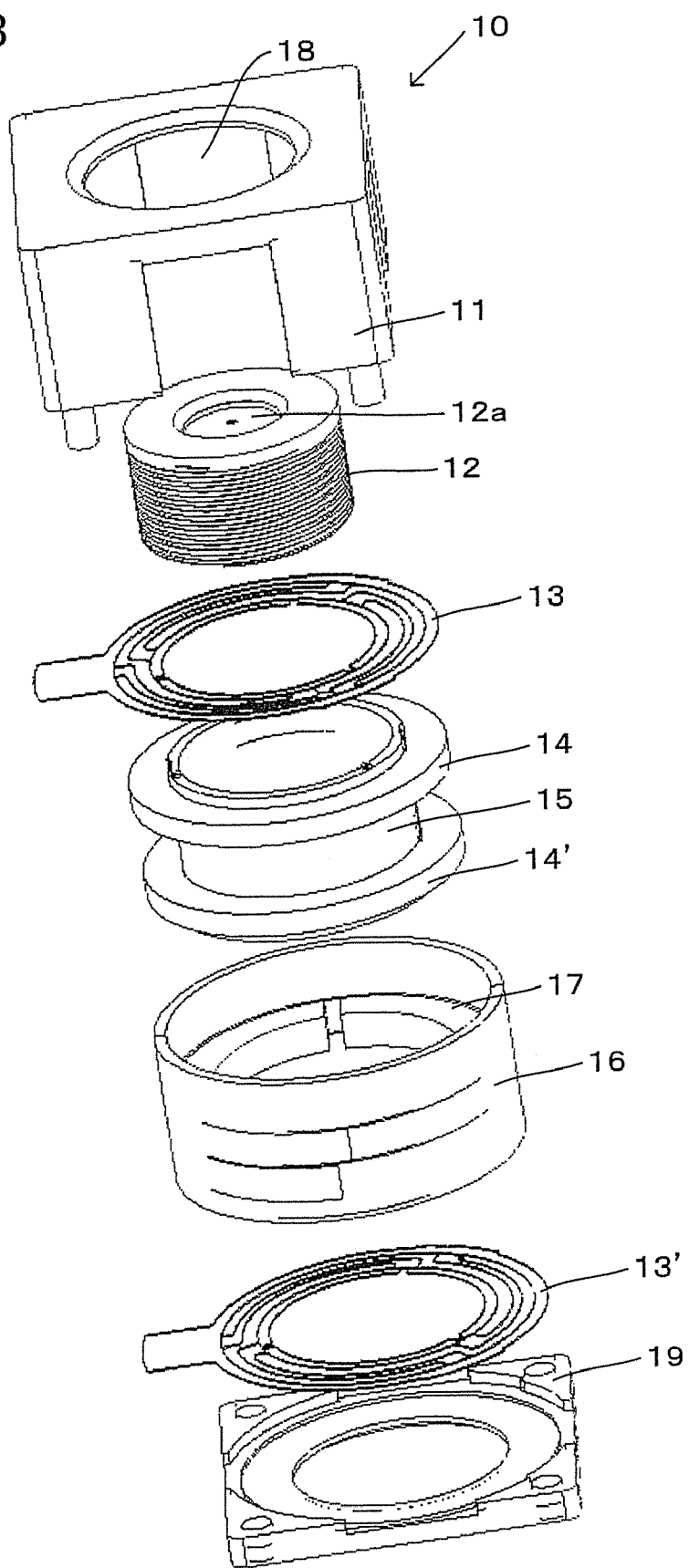
FIG. 3 is an exploded perspective view for explaining an assembling method of a lens drive device in accordance with an embodiment of the present invention.

FIG. 1 is a perspective cross sectional view showing a mechanical structure of a lens drive device 10 in accordance with an embodiment of the present invention. In FIG. 1, for convenience of explanation, an upper side is set to be a front side which is a near side to an object to be photographed. FIG. 2 is a plan view showing a structure of a plate spring 13' in the lens drive device 10 shown in FIG. 1. FIG. 3 is an exploded perspective view for explaining an assembling method of the lens drive device 10 in accordance with an embodiment of the present invention.

In FIGS. 1 through 3, the lens drive device 10 includes a cover holder 11 and a holder support 19, which correspond to a part of a fixed body, and a sleeve 15 corresponding to a part of a lens movable body. As shown in FIG. 3, a lens-barrel 12 whose optical axis is located at its center and which is formed in a substantially cylindrical shape is attached in an inside of the sleeve 15 (not shown in FIG. 1), and a lens 12a is provided in an inside of the lens-barrel 12. The lens 12a is generally structured of a plurality of lenses.

The cover holder 11 and the holder support 19 are structured so as to be capable of being fitted and they movably support the sleeve 15 in an optical axis direction of the lens 12a. Further, a cylindrical yoke 16 is fixed by the cover holder 11 and the holder support 19. A magnet 17, which is formed in a ring shape, is fixed on an inner peripheral face of the yoke 16. In other words, the magnet 17 is fixed to the yoke 16 so as to protrude on an inner side from the inner peripheral face of the yoke 16. The magnet 17 is magnetized in a direction perpendicular to the optical axis direction of the lens 12a. The yoke 16 is formed of a ferromagnetic body such as a steel plate.

A first coil 14 which is formed in a ring shape is fixed on a front side of an outer periphery of the sleeve 15 and a second coil 14' which is formed in a ring shape is fixed on its rear side. In other words, the first coil 14 is disposed on the outer periphery of the sleeve 15 so as to face the front side of the magnet 17, and the second coil 14' is disposed on the rear side of the magnet 17 so as to interpose the magnet 17 with the first coil 14 in the optical axis direction. As a result, a rear end face of the first coil 14 faces a front end face of the magnet 17 and a front end face of the second coil 14' faces a rear end face of the magnet 17. The first coil 14 and the second coil 14' which are fixed to the sleeve 15 are relatively movable to the yoke 16 in the optical axis direction of the lens 12a.

Magnetic flux generated from an N-pole of the magnet 17 passes through, for example, the sleeve 15, the first coil 14 and the yoke 16 and returns to the magnet 17. Further, magnetic flux generated from the N-pole of the magnet 17 passes through, for example, the sleeve 15, the second coil 14' and the yoke 16 and returns to the magnet 17. Therefore, a magnetic circuit (magnetic path) is formed by members such as the first coil 14, the second coil 14', the yoke 16 and the sleeve 15. In this case, it is preferable that magnetic material is used as material of the sleeve 15.

A distance between opposite faces of the first coil 14 and the second coil 14' is larger than a thickness in the optical axis direction of the magnet 17. Therefore, a clearance is formed between the magnet 17 and the first coil 14 (or the second coil 14') in the optical axis direction and the sleeve 15 integrated with the first coil 14 and the second coil 14' is capable of moving in the optical axis direction of the lens 12a within a range of the clearance.

A circular incident aperture 18 for taking a reflected light from an object to be photographed into the lens 12a (see FIG. 3) is formed at a center on the front side of the cover holder 11. Further, the lens drive device 10 is provided with a plate spring 13 and a plate spring 13' for restricting movement of the sleeve 15 (the plate spring 13 is not shown in FIG. 1). The plate spring 13' will be described in detail with reference to FIG. 2.

In FIG. 2, the plate spring 13' which is attached to the holder support 19 is engaged with turning prevention grooves formed in the holder support 19. In this manner, the plate spring 13' is prevented from turning.

The plate spring 13' is a metal spring such as a magnetic stainless steel of a copper system or a phosphorus system through which an electric current can be supplied, and the rear end of the sleeve 15 is mounted on the most inner circumferential portion 13'a of the plate spring 13'. The circumferential portion 13'a is formed with three terminals 13'b for supplying an electric current to the second coil 14' and an electric current can be supplied to the second coil 14' through the terminals 13'b.

Detailed description is omitted here but, similarly to the plate spring 13', the plate spring 13 is formed with terminals for supplying an electric current to the first coil 14, and an electric current can be supplied to the first coil 14 through the terminals. In this manner, the plate spring 13 and the plate spring 13' are capable of functioning as an electric wiring for power supply for the first coil 14 and the second coil 14'. Therefore, a circuit wiring for the lens drive device 10 becomes easy and a size of the entire lens drive device 10 can be reduced.

Spherical magnetic members 30 are disposed on an opposite side to the magnet 17 so as to interpose a part of the sleeve 15. Therefore, a magnetic attraction force acts between the magnetic members 30 and the magnet 17 so that the sleeve 15 can be fixed (movement is restricted) at a position shown in FIG. 1 (home position). The restricting operation will be described in detail below.

Next, an assembling method for the lens drive device 10 will be described with reference to FIG. 3. In FIG. 3, the lens drive device 10 in FIG. 1 is schematically shown and the spherical magnetic members 30 and the like are omitted. The first coil 14 and the second coil 14' have been fixed on the outer periphery of the sleeve 15 in advance and the lens-barrel 12 having the lens 12a has been assembled into the inside of the sleeve 15 in advance. Further, the magnet 17 has been fixed on the inner peripheral face of the yoke 16 in advance. The magnet 17 is provided with cracks in the optical axis direction and thus the magnet 17 is capable of being separated into four pieces.

In FIG. 3, first, the plate spring 13' is attached to the holder support 19 so as to engage with the turning prevention grooves formed in the holder support 19. Next, the magnet 17 which is separated into four pieces is adhesively bonded on the yoke 16 so that the magnet 17 is interposed between the first coil 14 and the second coil 14' which are fixed on the outer periphery of the sleeve 15. Then, the yoke 16 into which the sleeve 15 is assembled is fixed to the holder support 19. In this case, the rear end of the sleeve 15 is mounted on the most inner circumferential portion 13'a of the plate spring 13'. Finally, the plate spring 13 is placed so that its most inner circumferential portion is abutted with the front end of the sleeve 15 and then, the cover holder 11 is engaged with the holder support 19. In this manner, the lens drive device 10 shown in FIG. 1 is assembled. In this embodiment, a tongue-shaped portion is formed in the plate spring 13 and the plate spring 13' on an outer side in a radial direction (see FIG. 3). This is used as a power feeding part to the coil.

Detail on a current supply means which is connected to the power feeding part is omitted. However, for example, when the lens drive device 10 is assembled into a cellular phone with camera, a control means provided in an inside of the cellular phone with camera is used as the current supply means and, when the lens drive device 10 is assembled into a digital camera, a control means provided in an inside of the digital camera is used as the current supply means. In this manner, the power feeding part is connected to a control means of a host device. The control means supplies a current to the coil at a prescribed timing (for example, at a timing of receiving a trigger signal from a sensor for detecting an external force). The control means can change a direction of an electric current flowing through the first coil 14 and the second coil 14'. For example, the control means supplies an electric current in a prescribed direction through the first coil 14 and the second coil 14' based on receiving the above-mentioned trigger signal.

Figure 4A:
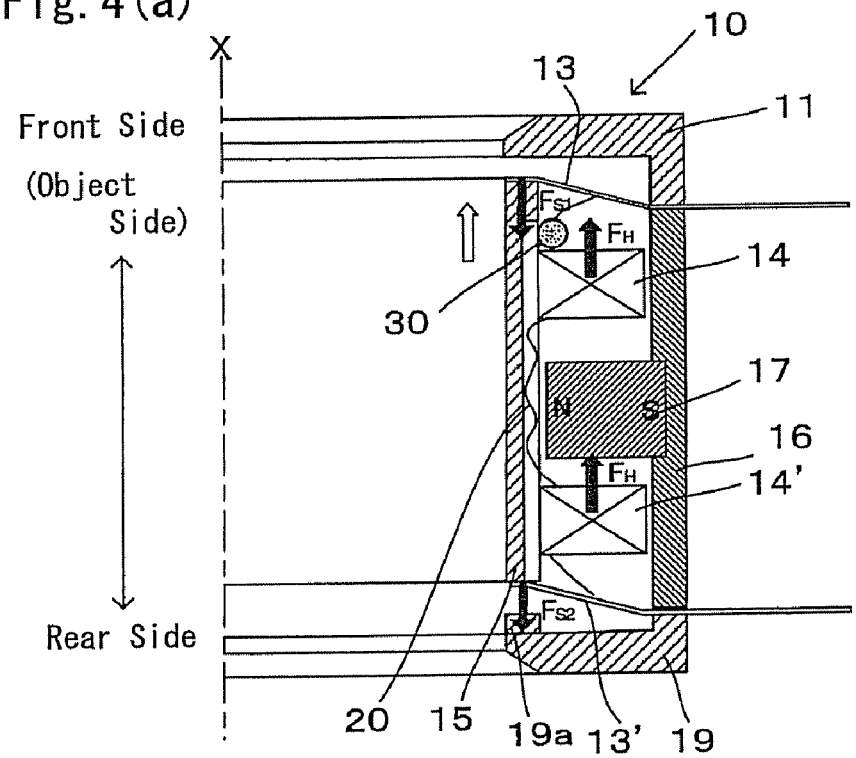
FIGS. 4($a$) and 4($b$) are explanatory cross sectional views for explaining states where movement of a sleeve is restricted in a lens drive device.
Figure 4B:
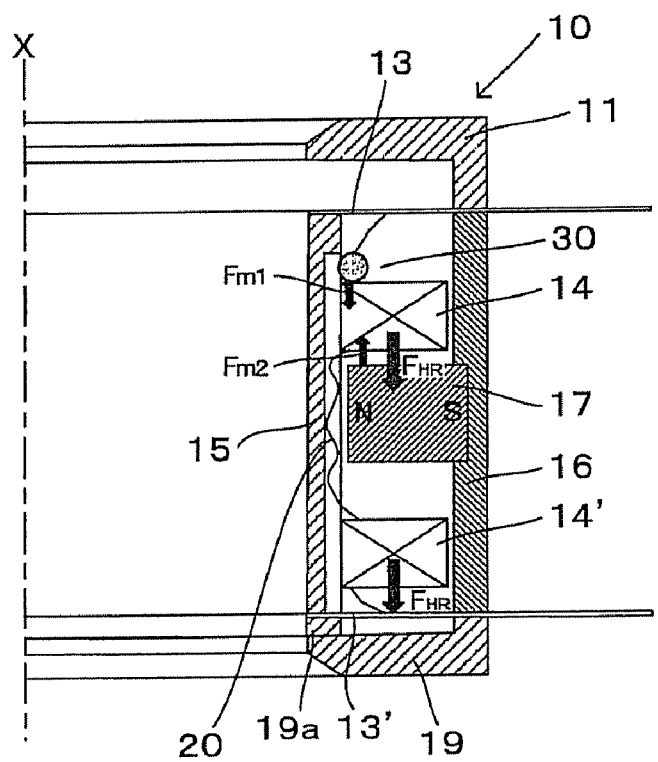

FIGS. 4(a) and 4(b) are explanatory cross sectional views for explaining states where movement of the sleeve 15 is restricted in the lens drive device 10. Also in FIGS. 4(a) and 4(b), for convenience of explanation, similarly to FIG. 3, the lens drive device 10 in FIG. 1 is schematically shown (especially, a portion around the magnetic member 30, the first coil 14, the second coil 14' and the like are simplified) and a mechanical structure of a half portion on its right side with respect to the optical axis is shown. The magnet 17 is magnetized so that its inner side in a radial direction is an N-pole and its outer side is an S-pole.

In FIG. 4(a), a magnetic flux generated from the N-pole of the magnet 17 passes the sleeve 15→the first coil 14→the yoke 16. Further, a magnetic flux generated from the N-pole of the magnet 17 passes the sleeve 15→the second coil 14'→the yoke 16. In this state, in FIG. 4(a), an electric current is supplied to the first coil 14 and the second coil 14' in the same direction (for example, an electric current is supplied from the back side to the before side in the paper). Therefore, the first coil 14 and the second coil 14' during energization which are located in the magnetic field respectively receive an electromagnetic force "$F_H$" in an upward direction (front side) (see the arrow in FIG. 4(a)). In this manner, the sleeve 15 on which the first coil 14 and the second coil 14' are fixed has been moved to the front side.

In this embodiment, an electric wiring 20 for power supply is disposed on the sleeve 15 and a current flowing through the first coil 14 is set to be equal to a current flowing through the second coil 14'. Therefore, substantially equal electromagnetic forces "$F_H$" act on the first coil 14 and the second coil 14'. Further, since the entire lens drive device 10 is small, a magnetic flux passing through the first coil 14 and a magnetic flux passing through the second coil 14' can be assumed to be substantially equal to each other.

On the other hand, forces for respectively restricting movement of the sleeve 15 (elastic force "$F_{S1}$" and elastic force "$F_{S2}$") are generated between the plate spring 13 and the front end of the sleeve 15 and between the plate spring 13' and the rear end of the sleeve 15 (see the arrows in FIG. 4(a)). Therefore, in FIG. 4(a), the electromagnetic force "$F_H+F_H$" which is going to move the sleeve 15 to the front side balances with the elastic force "$F_{S1}+F_{S2}$" for restricting the movement of the sleeve 15 to cause the sleeve 15 to stop.

Next, when it is changed to a normal photographing position (also a position where the camera is not used) from the macro photographing position, the lens drive device 10 is moved to a state shown in FIG. 4(b) from the state shown in FIG. 4(a). When described specifically, in a state that the first coil 14 and the second coil 14' are not energized, the above-mentioned electromagnetic force "$F_H$" does not act on the first coil 14 and the second coil 14' and thus the sleeve 15 returns to the original home position by the elastic forces "$F_{S1}$" and "$F_{S2}$" of the plate spring 13 and the plate spring 13'.

The sleeve 15 is held by magnetic attraction forces "$F_{m1}$" and "$F_{m2}$", which act between the magnetic members 30 and the magnet 17. Therefore, swinging and rattling of the sleeve 15 are prevented and, as a result, variation of a stationary positional accuracy of the lens movable body such as the lens 12a or the lens-barrel 12 at the time of a normal photographing (or, when the camera is not used) can be restrained.

Especially, in this embodiment, the position of the sleeve 15 at the time of a normal photographing (or, when the camera is not used) (see FIG. 4(b)), i.e., the position of the sleeve 15 in the state where the first coil 14 and the second coil 14' are not energized is set to be the "home position". Further, when any external force is applied, for example, when an apparatus into which the lens drive device 10 is assembled is dropped, when the device is shaken or, even when effects of a vibrating motor, magnetic field or electromagnetic wave are applied, an electric current is supplied so as to flow through the first coil 14 and the second coil 14' in a reverse direction to a direction of an electric current for moving the sleeve 15 (reverse direction to the case when an electric current is supplied as shown in FIG. 4(a)). In this case, the sleeve 15 is pressed on its rear side.

Described specifically, the holder support 19 is formed with an abutting part 19a for supporting the rear end of the sleeve 15 through the plate spring 13'. When an electric current is supplied so as to flow through the first coil 14 and the second coil 14' in a reverse direction to the direction of the electric current, which is supplied for moving the sleeve 15 (the direction of the electric current flown to obtain the state shown in FIG. 4(a)), an electromagnetic force "$F_{HR}$" is generated in a reverse direction to the direction shown in FIG. 4(a) and the sleeve 15 is pressed against the abutting part 19a through the plate spring 13'. As a result, even when an external force is applied, swinging and rattling of the sleeve 15 are hard to be occurred and thus movement from the home position is restricted. In this embodiment, as described above, the movement from the home position of the sleeve 15 is also restricted by the magnetic attraction forces "$F_{m1}$" and "$F_{m2}$" by using the magnetic members 30. In addition, the plate spring 13 and the plate spring 13' urge the sleeve 15 to the home position and thus movement from the home position of the sleeve 15 is restricted also by the plate spring 13 and the plate spring 13'.

As described above, according to the lens drive device 10 in accordance with this embodiment, when an electric current flows through the first coil 14 and the second coil 14' in the reverse direction to the direction of the current which is supplied when the sleeve 15 is to be moved, the sleeve 15 is restricted at the prescribed home position (see FIG. 4(b)). As a result, swinging and rattling are hard to occur in the sleeve 15 and its impact resistance can be enhanced. Especially, the rear end of the sleeve 15 is pressed against the abutting part 19a of the holder support 19 through the plate spring 13'. Therefore, swinging and rattling of the sleeve 15 can be further surely prevented. Further, when swinging and rattling is prevented, noise such as a "rattling" noise can be prevented and, as a result, silentness can be enhanced.

Further, in the lens drive device 10 in accordance with this embodiment, movement of the sleeve 15 can be restricted by supplying an electric current to the first coil 14 and the second coil 14' in the specified direction. Therefore, even when impact resistance is enhanced, strengths of the plate spring 13 and the plate spring 13' can be reduced or magnetism of the magnetic member 30 can be reduced. As a result, a starting current can be reduced and an electric power consumption can be also reduced.

Further, when a magnitude of the electric current flowing through the first coil 14 and the second coil 14' in the reverse direction to the direction of the current which is supplied for moving the sleeve 15 is set to be an appropriate value, a magnitude of the restricting force (electromagnetic force "$F_{HR}$" shown in FIG. 4(b)) can be adjusted. Therefore, a current value of the starting current which starts to move the sleeve 15 can be set with a simple setting operation.

In addition, according to this embodiment, the urging members (plate springs 13 and 13') and the spherical magnetic members (magnetic ball) 30 are provided as the drive mechanism for the lens drive device 10. Therefore, the sleeve 15 can be easily held at the prescribed home position. However, the present invention is not limited to the above-mentioned embodiment. For example, the lens drive device 10 in accordance with this embodiment may include no members such as a spring (for example, the urging member and the magnetic member 30) for restricting the movement of the sleeve 15. When another member such as the spring is not provided, its manufacturing cost can be reduced.

The lens drive device 10 may be assembled into various electronic apparatuses in addition to a cellular phone with camera. For example, the lens drive device 10 may be assembled into a PHS, a PDA, a bar code reader, a thin type digital camera, a monitoring camera, a camera for rear confirmation for use in a car, a door having an optical authentication function.

Especially, a servo-control for driving a vibration motor which is used in a commonly used cellular phone is structured so that, when a receiving signal for the phone is received, a servo signal is transmitted to a servomotor to turn the servomotor "ON". The servomotor is turned "ON", in other words, when a servo signal is transmitted, there is a possibility that vibration is transmitted to the lens drive device 10 from the servomotor.

Therefore, it is preferable that, when the servomotor is turned "ON", an electric current is supplied in a reverse direction to a direction when the sleeve 15 is to be moved. As a result, movement from the home position of the sleeve 15 is restricted and thus impact resistance can be enhanced. This application will be described in detail below with reference to FIGS. 5(a) and 5(b).

Figure 5A:
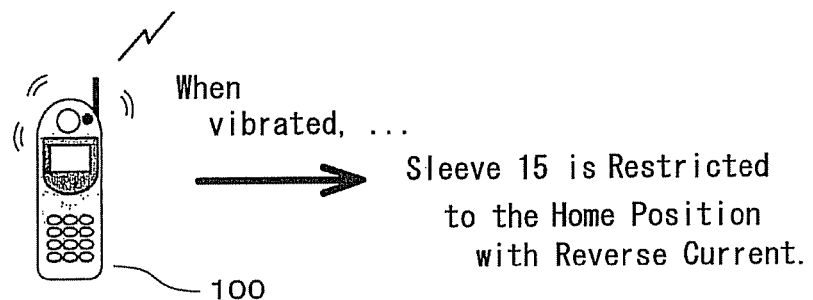
FIG. 5($a$) is an explanatory view and FIG. 5($b$) is a block diagram, both of which show an example when a lens drive device is assembled into a cellular phone.
Figure 5B:
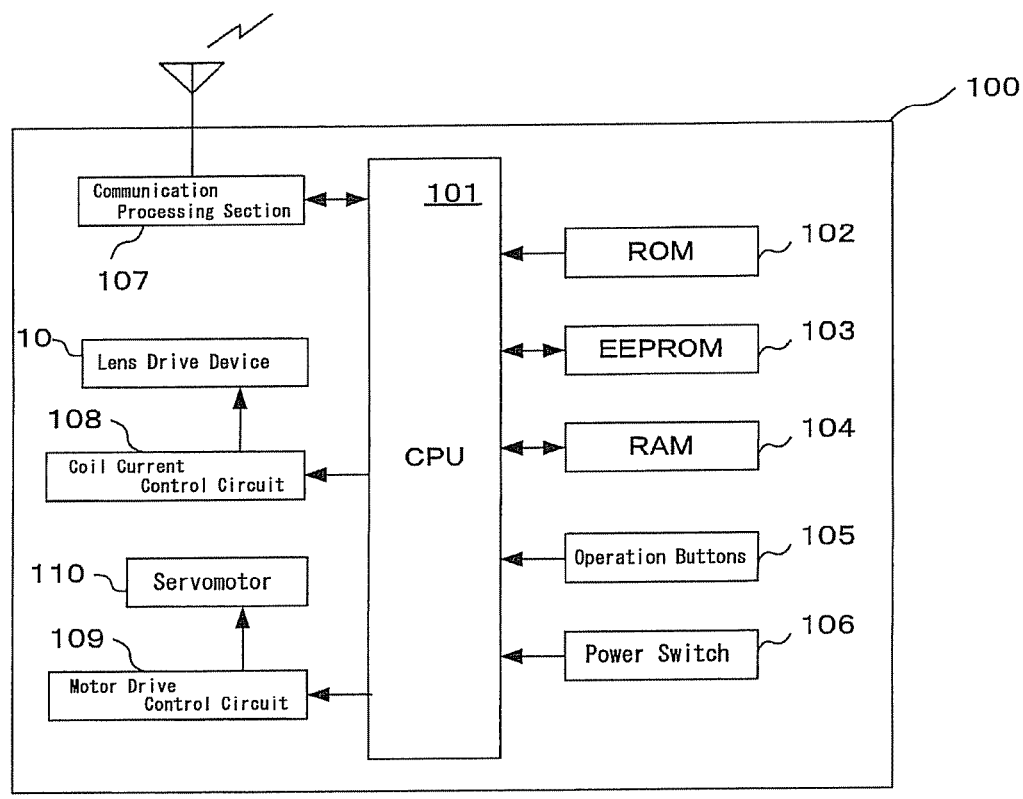

FIG. 5(a) is an explanatory view and FIG. 5(b) is a block diagram showing an example when the lens drive device 10 is assembled into a cellular phone 100. FIG. 5(a) is its schematic explanatory view and FIG. 5(b) is a block diagram showing a hardware structure of the cellular phone 100. The hardware structure shown in FIG. 5(b) is only one example and the present invention is not limited to this structure. For example, in FIG. 5(b), an LCD, a microphone or a speaker is omitted.

As shown in FIG. 5(b), the cellular phone 100 includes a CPU 101, an ROM 102, an EEPROM 103, an ROM 104, operation buttons 105, a power switch 106, a communication processing section 107, the lens drive device 10, a coil current control circuit 108, a motor drive control circuit 109 and a servomotor 110.

The CPU 101 controls respective parts of the cellular phone 100 and structures a core portion for controlling the cellular phone 100. When a power supply of the cellular phone 100 is turned "ON", the CPU 101 reads out and executes "IPL" (Initial Program Loader) stored in the ROM 102. When the "IPL" is executed, an initializing program is read out from the ROM 102 to execute initializations of the respective parts of the cellular phone 100. In the CPU 101, when execution of the initializing program has ended, an OS (Operating System) program is read out from the ROM 102 to be executed.

The CPU 101 which executes the OS program performs various processings depending on signals which are inputted. For example, when a person holding the cellular phone 100 operates an operation button 105, an instruction of the person is specified on the basis of a signal inputted through the operation button 105 and processing according to the instruction is performed.

The ROM 102 stores the above-mentioned various programs which are to be executed by the CPU 101. For example, the ROM 102 stores the "IPL", the initializing programs performing initializations of the respective parts of the cellular phone 100, the OS programs controlling the entire cellular phone 100 and the like. The EEPROM (Electrically Erasable Programmable Read Only Memory) 103 stores, for example, data for controlling the cellular phone 100 and an address book table storing telephone numbers and email addresses to which the holder of the cellular phone 100 performs a phone call and transmits and receives an electronic mail. The RAM (random access memory) 104 is a readable and writable memory which functions as a working area of the CPU 101 and temporarily stores data which are used by programs executed by the CPU 101.

The communication processing section 107 includes a circuit which is capable of performing a radio communication with a server of a contracted cellular phone company of the cellular phone 100 and is, for example, structured of a baseband IC, an RF (Radio Frequency) IC and the like. An antenna is connected to the communication processing section 107 in which a signal to be transmitted from the antenna is amplified, or in which a signal received from a radio base station is provided to the CPU 101. In other words, the cellular phone 100 radiates a radio wave to a radio base station or takes a radio wave radiated from a radio base station through the communication processing section 107 and the antenna. In this manner, the cellular phone 100 is capable of performing a telephone call and a data communication through the radio base station.

The cellular phone 100 includes the coil current control circuit 108 for supplying a desired electric current to the first coil 14 and the second coil 14' of the lens drive device 10, the servomotor 110 and the motor drive control circuit 109 for notifying the holder with vibration an incoming call to the cellular phone 100 through the communication processing section 107.

When the CPU 101 receives a signal of an incoming call from the communication processing section 107, the CPU 101 transmits a servo signal for turning the servomotor "ON" to the motor drive control circuit 109. When the motor drive control circuit 109 receives the servo signal, the motor drive control circuit 109 drives the servomotor 110 (the servomotor 110 is turned "ON") to vibrate the cellular phone 100.

In this case, the CPU 101 transmits the servo signal to the motor drive control circuit 109 and transmits an electric current switching signal to the coil current control circuit 108. The coil current control circuit 108 which has received this electric current switching signal supplies an electric current to the first coil 14 and the second coil 14' of the lens drive device 10 in the reverse direction to the direction of the current which is supplied for moving the sleeve 15. In this manner, the sleeve 15 of the lens drive device 10 is restricted at the home position at the timing of vibration of the cellular phone 100 and, as a result, swinging and rattling of the sleeve 15 is prevented.

As described above, in the lens drive device 10 in accordance with the embodiment which is assembled into the cell phone 100, the sleeve 15 can be restricted at the home position at the timing when the cell phone 100 is vibrated to easily cause the sleeve 15 to swing and rattle. Therefore, impact resistance can be enhanced with software (through program) without modifying its hardware structure.

Figure 6:
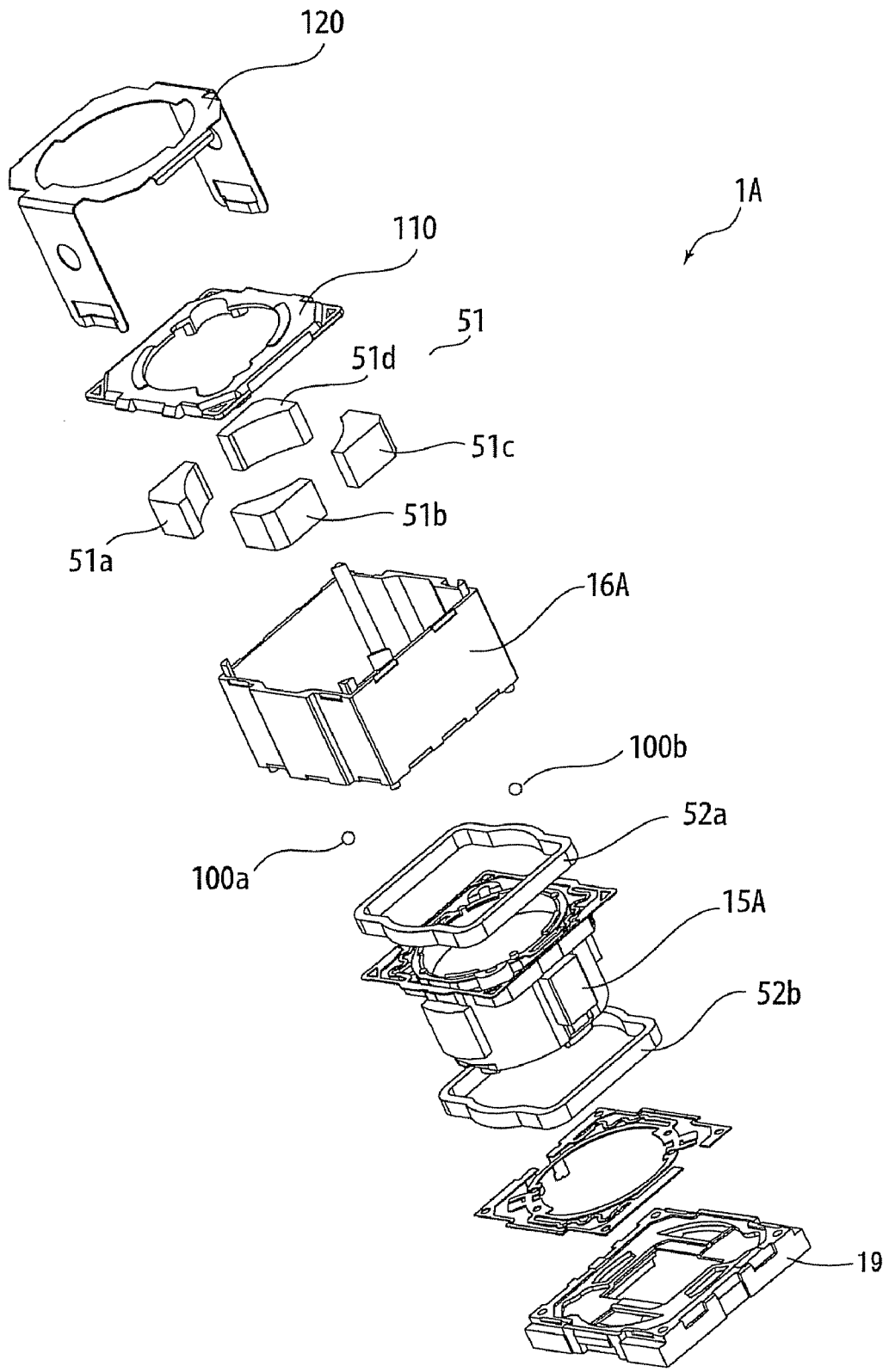
FIG. 6 is an exploded perspective view showing a mechanical structure of a lens drive device in accordance with another embodiment of the present invention.

The present invention may be applied to a lens drive device 1A shown in FIG. 6. The lens drive device 1A in this embodiment includes a roughly rectangular back yoke 16A which is an outer frame of the lens drive device 1A, four pieces of magnets 51a through 51d which are attached so as to correspond to respective corner parts on an inner peripheral side of the back yoke 16A, and a first coil 52a and a second coil 52b which are wound in a roughly rectangular shape and attached to the sleeve 15A so that the magnets are interposed between the first coil 52 and the second coil 52b in an optical axis direction. In the lens drive device 1A, when an electric current is supplied to the first coil 52a and the second coil 52b, the sleeve 15A is moved up and down along the optical axis direction. Magnetizing directions of an inner peripheral side and an outer peripheral side of the magnet are different from each other. Further, magnetic balls 100a and 100b are provided for holding the sleeve 15A at a position on an image sensor element side and a set (two holes) of holding holes (not shown) for holding the magnetic balls are formed at opposite corner parts on an object side of the sleeve. A cover holder 110 is attached on an object to be photographed side of the back yoke 16A and an outer cover 120 is provided for holding from the cover holder 110 to an holder support 19 and for covering an aperture formed in the sleeve. In this embodiment, other parts are the same as the above-mentioned embodiment and thus their description is omitted.

The present invention is not limited to the above-mentioned embodiments. For example, it may be structured that the coils are attached on the outer periphery of the sleeve 15 (15A) and the magnet 17 is fixed on the inner peripheral face of the yoke 16 so as to face the coils in a radial direction. Further, instead of providing the magnetic balls 100a and 100b for holding the sleeve 15A on the image sensor element side, for example, a ring-shaped magnetic member may be attached to the sleeve 15 so as to be located near the magnet 17.

The lens drive device in accordance with the present invention is effective to improve impact resistance while preventing an electric current, which starts the lens support body to move, from becoming large.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a lens movable body which is provided with a lens;
a drive mechanism for moving the lens movable body from a home position in an optical axis direction of the lens; and
a fixed body which movably supports the lens movable body in the optical axis direction of the lens;
wherein the drive mechanism includes a magnet and a plurality of coils; and
wherein one of the magnet and the plurality of coils is provided in the lens movable body and the other of the magnet and the plurality of coils is provided in the fixed body;
wherein an electric current is supplied to the plurality of the coils in one direction to move the lens movable body from the home position in the optical axis direction of the lens; and
wherein, in a state that the lens movable body is located at the home position, an electric current is supplied to the plurality of the coils in a reverse direction to the one direction for maintaining the lens movable body at the home position.

2. The lens drive device according to claim 1, further comprising an abutting part for restricting the movement of the lens movable body;
wherein in a state that the lens movable body is located at the home position, the electric current is supplied to the plurality of the coils in the reverse direction so that the lens movable body is pressed against the abutting part to be maintaining the lens movable body at the home position.

3. The lens drive device according to claim 2, wherein the drive mechanism includes an urging member which urges the lens movable body to the home position.

4. The lens drive device according to claim 3, wherein the drive mechanism includes a magnetic member which is magnetically attracted to the magnet.

5. The lens drive device according to claim 4, wherein the magnetic member is formed in a spherical shape.

6. The lens drive device according to claim 2, wherein the drive mechanism includes a plate spring which urges the lens movable body to the home position.

7. The lens drive device according to claim 6, wherein the plurality of the coils is provided in the lens movable body and the magnet is provided in the fixed body.

8. The lens drive device according to claim 7, wherein the lens movable body includes a magnetic member which is magnetically attracted to the magnet.

9. The lens drive device according to claim 1, wherein the drive mechanism includes an urging member which urges the lens movable body to the home position.

10. The lens drive device according to claim 9, wherein the drive mechanism includes a magnetic member which is magnetically attracted to the magnet.

11. The lens drive device according to claim 10, wherein the magnetic member is formed in a spherical shape.

12. The lens drive device according to claim 1, wherein the drive mechanism includes a magnetic member which is magnetically attracted to the magnet.

13. The lens drive device according to claim 12, wherein the magnetic member is formed in a spherical shape.

* * * * *